Patented Nov. 11, 1947

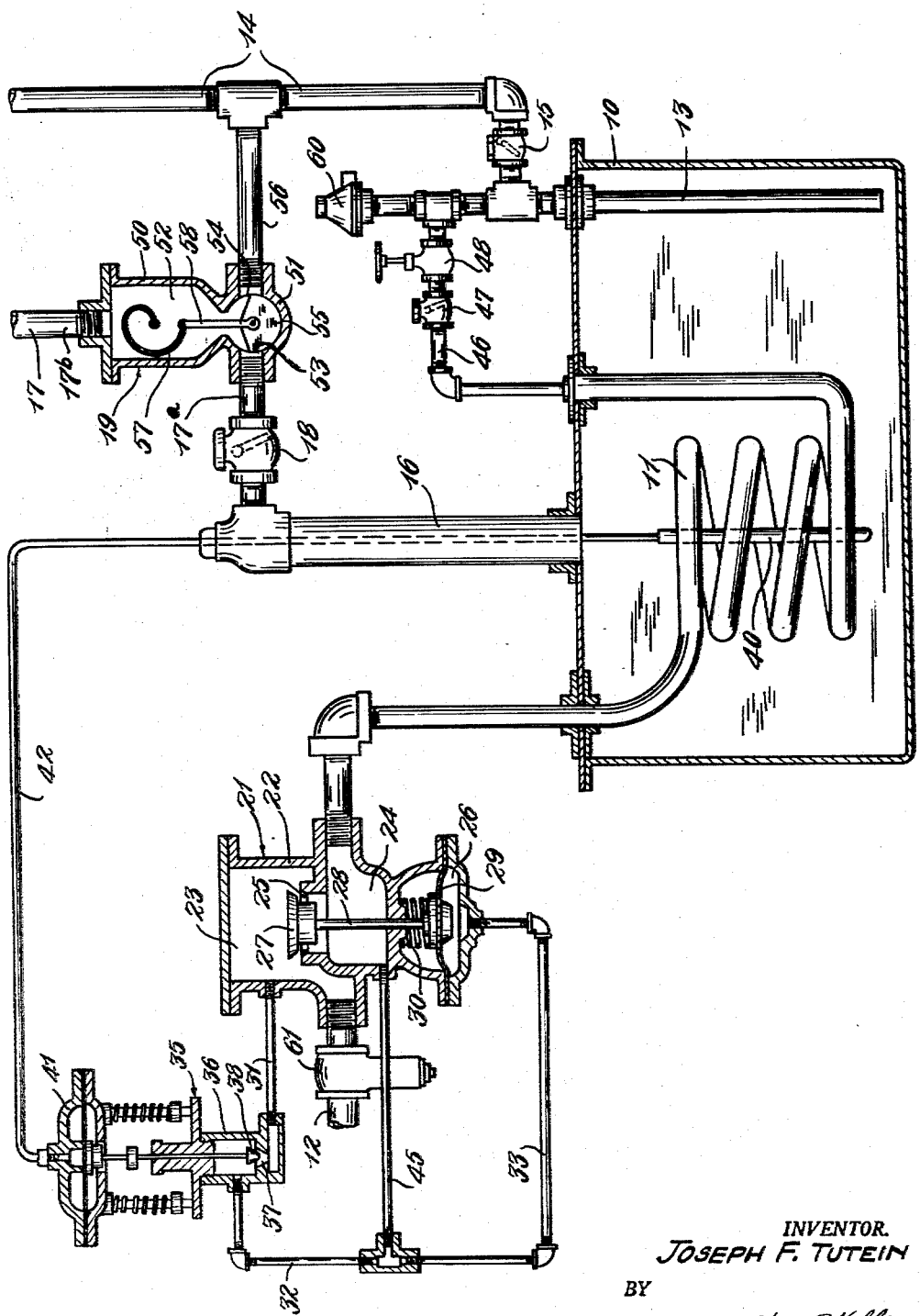

2,430,837

UNITED STATES PATENT OFFICE 2,430,837

APPARATUS FOR HEATING WATER AND OTHER LIQUIDS

Joseph F. Tutein, Crafton, Pa., assignor to Consulting Engineering Co., Crafton, Pa., a corporation of Pennsylvania Application December 23, 1943, Serial No. 515,353

7 Claims. (Cl. 257—2)

1

This invention relates to apparatus for heating water or other liquids and aims to provide improved apparatus of this kind which is safe and efficient in operation and is of a simple and economical construction which can be readily embodied in a compact unit adapted to be easily and quickly installed.

Another object of the invention is to provide an improved liquid heater which possesses the advantages of heaters of the instantaneous type but which also embodies a liquid storage tank and a temperature regulating means by which certain advantages of the storage type of heater are also obtained.

Still another object of this invention is to provide an improved liquid heater, of the character mentioned, in which a steam coil heats the liquid in the storage tank and also discharges its condensate into such tank.

A further object of the invention is to provide for the trapping of the condensate in the steam coil to prevent overheating of the liquid in the storage tank.

Yet another object of the invention is to provide improved liquid heating apparatus in which a mixing device associated with the supply and delivery connections enables the apparatus to operate at full capacity without danger of delivering fluid of an excessive or dangerous temperature.

The invention may be further briefly summarized as consisting in certain novel combinations and arrangements of parts hereinafter described and particularly set out in the appended claims.

The single view of the accompanying sheet of drawings is an elevational view more or less diagrammatic in form and with portions in section, showing a liquid heating apparatus embodying my invention.

My improved liquid heating apparatus can be used for heating various kinds of liquids but is particularly useful for supplying hot water for showers and lavatories or for various industrial purposes. When hot water is being supplied to showers or the like, or for industrial purposes, it is very important that excessively hot water or steam be prevented from reaching the points of use because of the possibility that personal injury, or damage to property or materials, might result. As will be explained more in detail hereafter my heating apparatus accomplishes the desired heating of water or other liquid in a safe, efficient and satisfactory manner. For convenience in describing the invention, I shall refer to the liquid as being water but it will be understood, of course, that this involves no limitation on the use of the invention.

In the embodiment of the heating apparatus illustrated in the drawing, I show a tank 10 adapted to contain a quantity of water to be heated and having therein a coil 11 for heating the water and to which a suitable heating medium, such as steam under pressure, is supplied as by means of the pipe 12. The tank 10 has an inlet connection 13 with which is connected a cold water supply pipe 14 having a check valve 15 therein. The tank also has an outlet connection 16 for the hot water and with which a delivery pipe line 17 is connected for delivering the hot water to the desired point or points of use. The pipe line 17 contains a check valve 18 and a mixing or proportioning device 19 which will be described more in detail hereinafter. The tank includes a top cover member and the water inlet and outlet connections, as well as the supply and discharge connections for the heating coil, extend through this cover member.

The supply of steam to the coil 11 through the pipe 12 is controlled by suitable temperature responsive means, one form of which is shown in the drawing and includes a main control valve 21. This control valve comprises a housing 22 having steam inlet and delivery chambers 23 and 24 therein and a valve seat 25 located between such chambers. The housing 22 also embodies a diaphragm chamber 26. A valve element 27 cooperates with the seat 25 and has an actuating stem 28 extending into the chamber 26 and connected with the diaphragm 29 thereof. A compression spring 30 acts on the valve stem 28 to normally urge the valve 27 toward a closed position in engagement with the seat 25. A control conduit or passage formed by the pipes 31, 32 and 33 connects the steam inlet chamber 23 with the chamber 26, so that the valve 27 can be opened by admitting steam pressure below the diaphragm 29.

It is desirable to control the actuation of the valve 27 in response to the temperature of the water contained in the tank 10 and, to this end, there is provided a temperature responsive control device 35 in the control passage leading to the diaphragm chamber 26. The device 35 comprises a housing 36 having a valve seat 37 therein and a valve element 38 which cooperates with such seat for controlling the supply of steam to the diaphragm chamber 26. The control device 35 also includes a thermostat element or bulb 40 located in the tank 10 and connected with a diaphragm housing 41 by a tube 42.

When the temperature of the water in the tank 10 is relatively low the valve element 38 is held in its open position so as to permit steam pressure from the inlet chamber 23 of the main valve 21 to pass through the pipes 31, 32 and 33 to the diaphragm chamber 26. The steam pressure acting on the under side of the diaphragm 29 opens the valve 27 thereby permitting steam to be supplied to the coil 11 by the pipe 12. When the water in the tank has been heated to a predetermined value, the expansive fluid in the bulb 40 transmits pressure to the diaphragm housing 41 through the tube 42 causing the valve 38 to be moved to its closed position. The steam pressure in the diaphragm housing 26 is vented or bled into the discharge chamber 24 of the valve housing 22 through the pipe connection 45 which permits the spring 30 to move the valve 27 to its closed position thereby cutting off the supply of steam to the heating coil 11. When the temperature of the water in the tank 10 drops the valve element 38 will be automatically opened to again admit steam to the diaphragm housing 26 thereby causing the valve 27 to be reopened so that steam will again be supplied to the coil 11.

As will be seen from the drawing the discharge end of the coil 11 is connected with the inlet 13 of the tank 10 through a pipe 46 which contains a check valve 47. The pipe 46 also contains an adjustable restriction or orifice which can be varied according to the capacity of the coil 11 and which can be located in a suitable device or valve 48. It will be noted also that the discharge end of the heating coil 11 extends upwardly above the top of the tank 10 and with the pipe 46 forms an elevated pipe loop so that condensate can be trapped in the coil. As just mentioned, the valve 48 constitutes an adjustable orifice device and during the operation of the apparatus the orifice or restricted opening of this device retards the flow of condensate out of the coil 11 so that there will always be a sufficient quantity of condensate retained in the coil, or in the pipe loop 46, to prevent steam from blowing through the coil and pipe loop. This prevents the discharge of steam directly into the water to be heated and avoids the noisy condition which would otherwise result from a sudden condensation of the steam in the water.

By connecting the discharge end of the coil 11 with the tank 10 in this manner it will be seen that as steam is used in the coil for heating the water it will be converted into condensate which is discharged into the tank, or into the incoming water supply, and mixed with the water being heated. The check valve 47 is arranged to permit the flow of such condensate in a direction from the coil to the tank and to prevent water from the tank, or cold water from the supply pipe 14, from flowing in a reverse direction into the coil. The check valve 15 of the cold water supply pipe 14 is arranged to permit the flow of cold water to the tank and to prevent condensate from the coil from backing up into the cold water supply pipe. All of the heat contained in the steam is thus transferred to the water and maximum efficiency is obtained for the heating operation.

The provision for trapping or retaining the condensate in the coil 11 also constitutes a safety feature which prevents overheating of the water in the tank 10 in the event that failure of the control device 21 should occur, such as breakage of the spring 30, which would permit the valve element 27 to remain open. The valve 27 can remain in an open position without producing any harmful effect because the coil 11 will fill up with condensate and this will prevent overheating of the water in the tank 10. The presence of the condensate in the coil 11 will also prevent steam from being delivered through the connection 16 and the pipe line 17 when a call for hot water occurs. By having the pipe loop extend above the top of the tank 10 it also makes the valve or adjustable orifice device 48 readily accessible for adjustment of the condensate discharge orifice or restricted opening to the size appropriate for the water heating capacity of the apparatus. The elevated position of the pipe loop also makes the check valves 45 and 47 and the pressure relief valve 60 readily accessible for servicing and inspection.

The mixing or proportioning device 14, above referred to, is another safety feature which prevents the delivery of water at an excessive temperature through the pipe line 17 or the delivery of steam in the event that failure of the main control valve 21 occurs. This mixing device comprises a housing 50 containing a proportioning valve 51 and a thermostat chamber 52. The proportioning valve 51 comprises a pair of ports 53 and 54 leading into the thermostat chamber and an oscillating plug or valve element 55 controlling such ports. The hot water delivery line 17 includes the connection 17a which leads into the mixing device 19 through the port 53 and also includes the pipe 17b which forms the outlet for the thermostat chamber 52. A branch connection 56 of the cold water supply pipe 14 is connected with the port 54.

The valve element 55 controls and proportions the flow of hot and cold water through the ports 53 and 54 into the thermostat chamber 52. The valve 55 is actuated automatically by a bi-metal element or thermostat 57 located in the chamber 52 and connected with the valve element by a lever 58. Since the hot water being supplied to the point of use flows through the chamber 52 and contacts the thermostat 57, it will be seen that the valve element 55 will be automatically shifted to admit proper amounts of hot and cold water through the ports 53 and 54 to produce a resultant temperature corresponding with that for which the thermostat is set. If the water being delivered from the tank 10 is too hot for safe use it will cause the thermostat 57 to shift the valve element 55 in a direction to decrease the opening of the port 53 and simultaneously increase the opening of the port 54 to thereby admit an increased amount of cold water which will be mixed with and reduce the temperature of the hot water. On the other hand if the temperature of the water being withdrawn from the tank 10 is relatively low, the valve element 55 will be shifted to increase the opening of the hot water port 53 and simultaneously decrease the amount of cold water being supplied through the port 54.

To prevent an unsafe pressure from building up in the tank 10, I may provide a pressure relief valve 60 at a suitable point such as on the inlet connection 13. Likewise, the steam supply pipe 12 can be provided with a suitable strainer 61 which is preferably located at a point in advance of the main control valve 21.

From the foregoing description and the accompanying drawing it will now be readily seen that I have provided an improved form of liquid heating apparatus which can be readily embodied in a compact unit and which is safe and efficient in operation.

While I have illustrated and described my improved liquid heating apparatus in more or less detail it will be understood, of course, that I do not wish to be correspondingly limited but regard my invention as including all changes and modifications coming within the spirit of the invention and the scope of the appended claims.

Having thus described my invention, I claim:

1. In liquid heating apparatus, a tank providing a heating and storage chamber for liquid and having an inlet and outlet for the liquid, a coil in said tank for heating the liquid therein, means for supplying steam to said coil, means responsive to the temperature of the liquid in the tank for controlling the steam supply to said coil, and means connecting the discharge end of said coil with said tank for the delivery of its condensate into said chamber, said connecting means defining a pipe loop extending above the top of the tank and containing a check valve and a flow retarding means embodying a restricted liquid flow passage such that condensate will be retained in said coil, said check valve being disposed so as to prevent a reverse flow of liquid into said coil.

2. Water heating apparatus comprising, a tank containing a heating and storage chamber for the water and having a hot water outlet, a cold water inlet extending into said chamber adjacent the top thereof, a heating coil in said chamber, means for supplying steam to said coil, means responsive to the temperature of the water in said chamber for controlling the steam supply to said coil, a cold water supply pipe connected with said cold water inlet, a check valve in the cold water supply connection and adapted to permit a flow of cold water into said chamber through said inlet, and means connecting the discharge end of said coil with said cold water inlet on the tank side of the cold water check valve for the delivery of condensate from said coil to said chamber, said connecting means defining a pipe loop extending above the top of said chamber and having therein a second check valve and a flow retarding means embodying a restricted liquid flow passage adapted to cause condensate to be retained in said coil, said second check valve being disposed so as to prevent a reverse flow of water into said coil.

3. In liquid heating apparatus, a tank providing a heating and storage chamber for liquid and having inlet means for admitting the liquid to be heated and outlet means for discharging the heated liquid, a coil in said tank for heating the liquid therein, means for supplying steam to said coil, means responsive to the temperature of the liquid in the tank for controlling the steam supply to said coil, and means connecting the discharge end of said coil with said tank for the delivery of its condensate into the liquid to be heated, said connecting means defining a pipe loop extending above the top of said tank and containing a flow retarding means adapted to retard said delivery of condensate so as to cause condensate to be retained in said coil.

4. A liquid heating apparatus as defined in claim 3 in which the flow retarding means contains a restricted liquid flow opening and is adjustable for varying the size of the liquid flow opening.

5. A water heater comprising, a tank having a top cover member and also containing a water heating and storage chamber, inlet and outlet means connected with said chamber through said cover member and adapted respectively for supplying water to be heated to said chamber and discharging heated water therefrom, a steam coil in said tank for heating the liquid therein and having supply and discharge passages extending through said cover member, means responsive to the temperature of the water in the tank for controlling the steam supply to the coil, and connecting means connecting the discharge passage of said coil with said inlet means for the delivery of condensate into the water to be heated, said connecting means being located at the top of said tank and including a flow retarding means adapted to retard said delivery of condensate so as to cause condensate to be retained in said coil.

6. A water heater comprising, a tank having a top cover member and also containing a water heating and storage chamber, inlet and outlet means connected with said chamber through said cover member and adapted respectively for supplying cold water to be heated to said chamber and discharging heated water therefrom, a steam coil in said tank and depending from the cover member for heating the liquid in said chamber and having supply and discharge passages extending through said cover member, means responsive to the temperature of the water in said chamber for controlling the steam supply to said coil, and connecting means connecting the discharge end of said coil with said chamber through said inlet means for the delivery of its condensate into the water to be heated, said connecting means defining a passage extending laterally at the top of said tank and containing a flow retarding means embodying a restricted liquid flow opening such that condensate will be retained in said coil and said connecting means also containing a check valve disposed to prevent a reverse flow of water into said coil.

7. A water heater comprising, a tank having a top cover member and also containing a water heating and storage chamber, inlet and outlet means connected with said chamber through said cover member and adapted respectively for supplying cold water to be heated to said chamber and discharging heated water therefrom, a steam coil in said tank and depending from the cover member for heating the liquid in said chamber and having supply and discharge passages extending through said cover member, means responsive to the temperature of the water in said chamber for controlling the steam supply to said coil, a cold water check valve in said inlet means and adapted to permit a flow of water to said chamber, and connecting means connecting the discharge end of said coil with said inlet means on the tank side of said cold water check valve for the delivery of its condensate into the water to be heated, said connecting means defining a passage extending laterally at the top of said tank and containing a flow retarding means embodying a restricted liquid flow opening such that condensate will be retained in said coil and said connecting means also containing a second check valve located between said coil and said flow retarding means and adapted to prevent a reverse flow of cold water into said coil.

JOSEPH F. TUTEIN.

REFERENCES CITED

The following references are of record in the file of this patent:

UNITED STATES PATENTS

| Number | Name | Date |
| --- | --- | --- |
| 1,962,214 | Russell | June 12, 1934 |
| 2,224,240 | Van Vulpen | Dec. 10, 1940 |
| 1,987,032 | Spence | Jan. 8, 1935 |
| 2,013,480 | Sandvoss | Sept. 3, 1935 |
| 2,029,203 | Soderberg | Jan. 23, 1936 |
| 2,372,533 | Torbett | Mar. 27, 1945 |
| 1,264,061 | Grey | Apr. 23, 1918 |

FOREIGN PATENTS

| Number | Country | Date |
| --- | --- | --- |
| 23,298 | Great Britain | Dec. 1, 1894 |